Sept. 10, 1957  F. J. IANNONE  2,806,151
PHASE INVERTER CIRCUIT
Filed Dec. 14, 1954
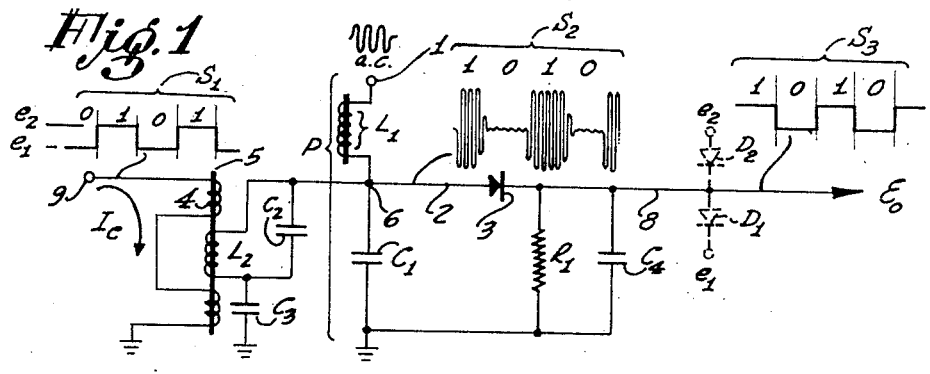
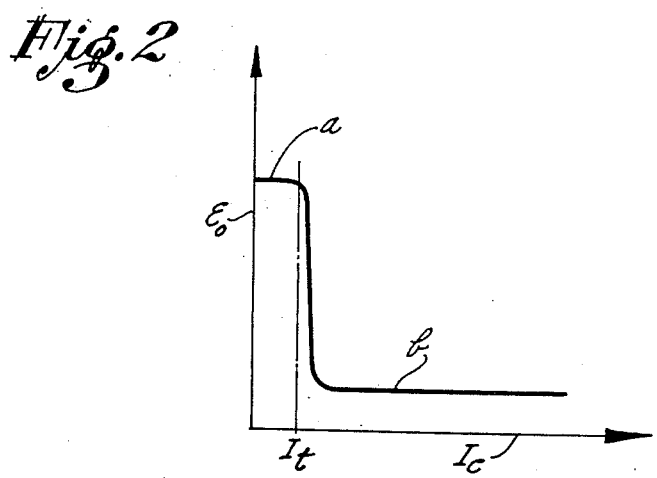
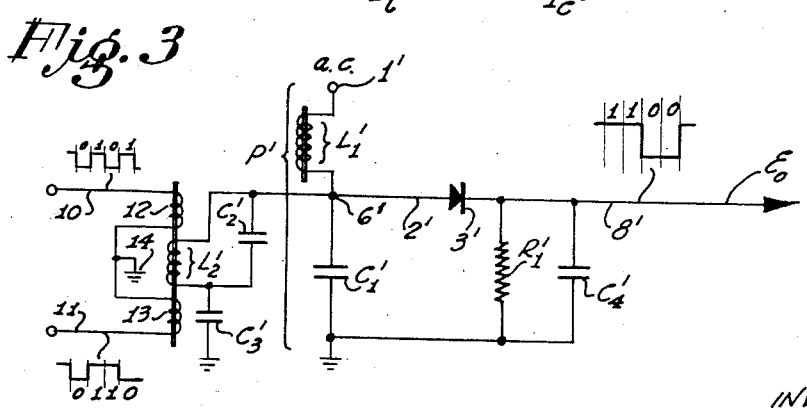
INVENTOR:
Francis J. Iannone
By Earl Beust
Louis A. Kline
John J. Matlago, Agent
His Attorneys United States Patent Office 2,806,151
Patented Sept. 10, 1957

2,806,151

PHASE INVERTER CIRCUIT

Francis J. Iannone, Culver City, Calif., assignor to The National Cash Register Company, Dayton, Ohio, a corporation of Maryland Application December 14, 1954, Serial No. 475,182

10 Claims. (Cl. 307—88)

This invention relates to phase inverter circuits and more particularly to an electrical circuit arrangement in which reactive components are employed to function as a phase inverter circuit.

Circuits utilizing reactive components therein, e. g., saturable core reactors, possess a high degree of reliability and utility inasmuch as they contain no fragile parts, and their maintenance is comparable to that of a conventional transformer. Furthermore, the power requirement of such devices is relatively low and they can be operated in an enclosed area without the need of supplementary cooling means. Since phase inverter circuits have numerous applications in the electronic computer art, as, for example, in the formation of digital complements, it is highly desirable to provide a reactive type phase inverter circuit.

One of the objects of this invention is to provide a highly sensitive phase inverter circuit whose output has a sharp response to abrupt changes in voltage signals applied on the input.

It is another object of this invention to provide a saturable core type phase inverter circuit which serves to amplify the inverted signal generated on the output thereof.

It is still another object of this invention to provide a novel electrical circuit arrangement comprised of reactive components which can be adapted to function as a comparison circuit.

Briefly, the invention herein disclosed comprises a non-linear resonance path including a saturable core inductor connected in series with a capacitor. A source of alternating potential is connected to this path. The junction between the saturable core inductor and the capacitor is connected to a highly sensitive loading means, e. g., the winding of another saturable core inductor which includes a capacitor in parallel therewith so as to effectively form a tank circuit. A second capacitor is connected in series with this tank circuit. A control winding is included about the saturable reactor in the tank circuit. The operation of the inverter circuit is such that the series non-linear resonance path is normally maintained in a relatively high current conducting state when the control winding has a relatively low D. C. voltage signal applied thereon. The effect of applying a relatively high D. C. voltage signal to the control winding of the saturable reactor in the tank circuit is to instantaneously load the series non-linear resonance path such that its operation switches to a relatively low current conducting state. An A. C. output signal is taken from the junction between the inductor and capacitor of the series non-linear resonance path. This A. C. output signal is rectified and filtered so as to provide a D. C. output signal which is the inverse of the D. C. input signal.

A more detailed description of this invention as well as additional objects and features thereof is contained in the following explanation of the drawings in which:

Fig. 1 is a schematic diagram of the invention.

Fig. 2 is an idealized graph for explaining the theory of operation of the circuit shown in Fig. 1.

Fig. 3 is a schematic diagram of a circuit arrangement showing how the embodiment of Fig. 1 can be adapted to function as a digital comparison circuit.

Reference will first be made to Fig. 1, which shows a schematic diagram of a preferred embodiment of the invention. This phase inverter circuit comprises a series non-linear resonance path P, including a non-linear saturable core inductor $L_1$ connected in series with a capacitor $C_1$. A source of alternating potential is applied to path P at terminal 1. This source of alternating potential and the value of the components in path P are chosen so as to normally maintain path P in a highly conductive state in accordance with the principles of ferroresonance.

Connected to junction 6 which is located between non-linear inductor $L_1$ and capacitor $C_1$ of path P is a highly sensitive loading means. In this embodiment of the invention, the loading means comprises a tank circuit, i. e., non-linear inductor $L_2$ in parallel with capacitor $C_2$; a capacitor $C_3$ connects the tank circuit to ground. It is to be noted that non-linear inductors $L_1$ and $L_2$ are preferably of a solenoidal type, having a rolled scroll type Permalloy core with a length-to-diameter ratio on the order of ten to one. A control winding 4 is wound about core 5 of inductor $L_2$. The D. C. input signal which is to be inverted is applied on terminal 9 of control winding 4, while the opposite end of control winding 4 is grounded.

Alternating current output from the phase inverter is taken from junction 6 by way of lead 2. This alternating current output is then rectified by means of diode 3. The cathode equivalent end of diode 3 is connected to a filter circuit made up of the parallel combination of resistor $R_1$ and capacitor $C_4$. The filtered D. C. output signal corresponding to the inverse of the input signal is thus available on lead 8 which is an extension of lead 2. Diodes $D_1$ and $D_2$, shown dotted in the figure, connect lead 8 to D. C. voltage levels $e_1$ and $e_2$, respectively. The provision of diodes $D_1$ and $D_2$ is optional, their use being dependent upon whether it is desired to limit the swing of the output signal.

The current through control winding 4 is termed "control current" and will be herein identified by the symbol $I_c$; similarly the voltage appearing on output lead 8 is termed "output voltage" and is designated $E_o$.

The operation of the invention shown in Fig. 1 can be more readily explained by reference to Fig. 2 which is an idealized plot of control current $I_c$ versus output voltage $E_o$. As indicated by point "a," the parameters of non-linear resonance path P are such that its output voltage $E_o$ is normally in a relatively high state in the absence of any substantial control current $I_c$ applied to input terminal 9. Point "a" thus occurs on the high $E_o$ voltage hump of the curve of Fig. 2 because in the absence of any substantial control current $I_c$ applied to input terminal 9, parameters of the parallel circuit combination of saturable core inductor $L_2$ and capacitor $C_2$ are such as to cause the tank circuit to tend toward parallel resonance at the frequency of the applied A. C., i. e., to present a relatively high impedance to current between path P and ground. Consequently only negligible current passes from junction 6 to ground by way of series capacitor $C_3$.

However, when an input signal of amplitude sufficient to effect a value of control current $I_c$ greater than a certain threshold value, herein designated $I_t$, is applied to input terminal 9, the output voltage $E_o$ sharply drops to a relatively low value represented by point "b," for example, in the graph of Fig. 2. This abrupt fall in output voltage $E_o$ occurs owing to the effect of increased control current $I_c$ through control winding 4 on saturable core 5, i. e., current $I_c$ nearly saturates core 5 with magnetic flux lines. The inductance of non-linear inductor $L_2$ is consequently reduced, effecting relatively high current through capacitor $C_3$. The value of capacitor $C_3$ is so chosen that the $L_2$—$C_3$ series combination now tends toward series resonance. The voltage appearing at junction 6 is lowered thereby and non-linear resonance path P is effectively loaded into its relatively low conducting state, i. e., operating at point "b" on the graph of Fig. 2.

Output voltage $E_o$ therefore sharply drops to a lower level "b" and continues at that level until control current $I_c$ is substantially reduced, thereby causing current cessation through capacitor $C_3$. Path P is now effectively returned to a relatively high conducting state "a" owing to the relatively high voltage now appearing at junction 6. Thus an amplified waveform signal can be effected on output lead 8 which is the inverse of the waveform applied at input terminal 9, for example.

As a typical example of the operation of the phase inverter circuit shown in Fig. 1, assume a binary input waveform signal 0101, herein designated $S_1$, is applied to control winding 4 at input terminal 9. Assume that a low voltage level $e_1$ is representative of a binary "zero" while a high voltage level $e_2$ is representative of a binary "one." Time scale is assumed to be from left to right; furthermore, high voltage level $e_2$ is of value sufficient to effect a control current $I_c$ in control winding 4 that is greater in value than threshold current $I_t$, e. g., $e_2 = +25$ volts; similarly, the low voltage level $e_1$ is of value insufficient to effect appreciable control current $I_c$, e. g., $e_1 = 0$ volts.

During the 0 volt level of input signal $S_1$, the A. C. voltage appearing on lead 2 is relatively high, as the first "one" in A. C. waveform $S_2$ indicates. But when the input waveform signal $S_1$ rises to its "one" level, i. e., from $e_1$ to $e_2$, sufficient control current $I_c$ is passed through control winding 4 to load non-linear resonance path P to its relatively low or "zero" state, i. e., point "b" on graph of Fig. 2. Appreciable current now passes through capacitor $C_3$ because the $L_2$—$C_3$ combination tends toward series resonance. When input signal $S_1$ returns to a 0 voltage level, however, i. e., back to $e_1$, the combination of $L_2$—$C_2$ tends toward non-linear parallel resonance, effecting a voltage rise at junction 6 since capacitor $C_3$ now presents a high impedance. The A. C. signal $S_2$ consequently attains its high voltage or "one" state again and continues at this high level until path P is again loaded into a low or "zero" state by a subsequent rise of input signal $S_1$ to voltage level $e_2$. Thus a D. C. input signal $S_1$ of configuration 0101, for example, applied to control winding 4 effects an amplified A. C. signal $S_2$ on lead 2 of inverse configuration, i. e., 1010.

This amplified A. C. signal $S_2$ is then rectified by means of diode 3 and smoothed by a filter circuit such as that comprised of the parallel combination of resistor $R_1$ and capacitor $C_4$, for example. The result is D. C. signal $S_3$, appearing on output lead 8. Output signal $S_3$ is thus the inverse or complement of input signal $S_1$, e. g., 1010 is the one's complement of 0101.

It is to be noted that the output waveform $S_3$, appearing on lead 8, can be clamped as indicated by diodes $D_1$ and $D_2$ which are shown dotted in Fig. 1 inasmuch as they are not essential components of the invention. Use of these output clampers enables the voltage swing of the output waveform signal $S_3$ to be maintained within the limits of the input signal $S_1$. This result is achieved by utilization of corresponding clamping voltages $e_1$ and $e_2$ applied to the cathode of diode $D_1$ and the anode of diode $D_2$, respectively. Thus means is provided for converting a typical binary signal sequence such as 0101, for example, into its complement 1010 for subsequent use in logical networks, e. g., diode gating operations dependent upon a plurality of input signals, each swinging between two voltage levels such as $e_1$ and $e_2$, for example.

In the schematic diagram comprising Fig. 3, an alternate embodiment of the invention is shown with its control winding adapted to operate as a novel gating circuit such that the overall circuit arrangement functions as a comparison circuit. Inasmuch as the operation of this circuit is substantially the same as was previously explained in conjunction with Fig. 1, like elements thereof bear similar reference designations, but with a prime added thereto.

Two input leads 10 and 11 are provided to the control winding which is divided by means of grounded centertap 14 into subwindings 12 and 13, each having the same number of turns therein. A current unbalance in subwindings 12 and 13 is necessary in order to obtain an output signal from the trigger winding. Thus when two substantially identical signal inputs are simultaneously applied to input leads 10 and 11, no effective control current output is obtained, owing to the substantially equal-valued bucking voltages set up in subwindings 12 and 13, respectively, of this control winding.

In summary, the gating operation of the control winding arrangement set forth in Fig. 3 is such that effective control current $I_c$ will be induced in saturable reactor $L_2'$ only when different polarity signals are simultaneously applied to input leads 10 and 11. This effect is illustrated by the serial waveform signals 0101 and 0110 applied simultaneously to inputs 10 and 11, respectively, yielding the amplified output signal 1100, as shown. Of course, this is but one representative example of the operation of this circuit which is commonly termed a comparison circuit. Furthermore, the output voltage appearing on lead 8' can be clamped if so desired, as was explained in conjunction with Fig. 1.

A comparison circuit of the type presented in Fig. 3 is especially useful in error indication, for example, between two identical circuits which are simultaneously computing the same problem.

In the foregoing specification, a low power, saturable core phase inverter circuit has been presented. Of course, the specific apparatus and circuits just described represent but one form of this invention and are not to be interpreted as a restriction or limitation thereof. It is apparent that modifications and variations of this phase inverter circuit may occur to those skilled in the electronic art without departing from the spirit and scope of this invention as defined in the appended claims.

What is claimed is:

1. A phase inverter circuit comprising a ferro-resonant path including a saturable reactor and a series capacitance; a source of A. C. potential applied to said path such that said path is normally in a high-current conducting state; an output circuit connected across the capacitance of said ferro-resonant path so as to normally have high level potential signals thereon; a source of high level potential input signals; and means connected across the capacitance of said path capable of responding to said high level potential input signals for maintaining said ferro-resonant path in a low-current conducting state so as to generate low level potential signals on said output circuit.

2. A phase inverter circuit comprising the combination of a series resonant circuit arrangement of a capacitance and a saturable core inductor; a parallel resonant circuit arrangement of a second capacitance and a second saturable core inductor; means including a third capacitance connecting said parallel circuit arrangement across the capacitance of said series circuit arrangement; control means inductively coupled to said second saturable core inductor for changing the degree of saturation thereof between one degree at which said parallel circuit arrangement is resonant and another degree at which said parallel circuit arrangement is non-resonant; and an output circuit connected across the capacitance of said series circuit arrangement.

3. A phase inverter circuit comprising a first ferro-resonant circuit including a capacitance connected in series with a non-linear inductor; a source of alternating potential connected to said first ferro-resonant circuit; a second ferro-resonant circuit including a capacitance connected in parallel with a non-linear inductor; a third capacitance connected in series with said second ferro-resonant circuit across the capacitance of said first ferro-resonant circuit; control means coupled to said second non-linear inductor to change the effective inductance thereof; and an output connected across the capacitance of said first ferro-resonant circuit, said circuits having capacitances and inductors of such value and being so operated that a control signal applied to said control means produces an amplified phase inverted signal on said output.

4. A comparison circuit comprising a first non-linear resonant branch including a saturable core inductor connected in series with a capacitance; a second non-linear resonant branch including a second saturable core inductor connected in parallel with a second capacitance; a third capacitance connected in series with said second non-linear resonant branch; a control winding about the core of said second saturable core inductor, said control winding having a centertap connected to ground reference potential; a control input connected to each end of said control winding; means for connecting the series circuit formed by said second non-linear resonant branch and said third capacitance across the capacitance of said first non-linear resonant branch; and an output circuit including a rectifier and filter circuit connected across the capacitance of said first non-linear resonant branch, whereby an output signal is generated on said output circuit when an input signal is applied on only one of said control inputs.

5. Apparatus of the class described comprising: a ferroresonant path including a non-linear inductor and a capacitance in series therewith; an alternating potential applied across said ferroresonant path such that said path is normally in a relatively high-current conducting state; an impedance control circuit connected across the capacitance of said ferroresonant path, said control circuit including a second non-linear inductor connected in parallel with a second capacitance and in series with a third capacitance, said control circuit normally operating with a high impedance; input means coupled to said second non-linear inductor; and a source of signals connected to said input means to decrease the inductance of said second non-linear inductor, thereby decreasing the impedance of said control circuit to cause said ferroresonant path to operate in a relatively low-current conducting state for the duration of each signal applied to said input means.

6. A circuit of the class described comprising: an alternating voltage source; a series non-linear circuit including a saturable core inductor and a capacitance connected to said alternating voltage source, said series circuit normally operating in a resonant conduction state; an output circuit connected across the capacitance of said series circuit; a control circuit including a second saturable core inductor connected across said output circuit; and means for changing the impedance of said control circuit by saturating the core of said second saturable core inductor to thereby load said series circuit into a non-resonant conduction state.

7. A phase inverted signal generator comprising: an alternating voltage source; a series resonant non-linear circuit including a saturable core inductor and a capacitance connected to said alternating voltage source; a control circuit for said series circuit including a second saturable core inductor connected across the capacitance thereof, said control circuit normally having a high impedance; a source of control signals; a control winding for saturating the core of said second saturable core inductor in response to said control signals to reduce the impedance of said control circuit; and an output circuit connected across the capacitance of said series circuit having phase inverted signals produced thereon in response to control signals on said control winding.

8. A phase inverter amplifier comprising: an alternating voltage source; a series non-linear circuit including a saturable core inductor and a capacitance connected to said alternating voltage source, said series circuit normally energized to operate in series resonance; a parallel non-linear circuit including a second saturable core inductor connected in parallel with a second capacitance; means for connecting said parallel circuit in series across the capacitance of said series circuit, said parallel circuit being normally energized to operate in parallel resonance; a control winding about the core of said second saturable core inductor; and a source of control signals connected to said control winding, whereby said parallel circuit becomes non-resonant in response to a control signal, thereby causing said series circuit to be loaded into a non-resonant condition.

9. A phase inverted signal generator comprising: an alternating voltage source; a series resonant non-linear circuit including a saturable core inductor and a capacitance connected to said alternating voltage source; a control circuit connected across the capacitance of said series non-linear circuit, said control circuit including a second saturable core inductor connected in parallel with a second capacitance and in series with a third capacitance; a source of control signals; a control winding for saturating the core of said second saturable core inductor in accordance with said control signals, said second saturable core inductor being in parallel resonance with said second capacitance to provide a high impedance when said control signal is low in potential, and being in series resonance with said third capacitance to provide a low impedance when said control signal is high in potential; and an output circuit connected across the capacitance of said series non-linear circuit.

10. A variable impedance loading circuit for connection across the output of an A. C. signal generator comprising: a saturable core inductor; a first capacitance connected in parallel with said inductor; a second capacitance connected in series with the parallel circuit formed by said inductor and said first capacitance; a control winding for said saturable inductor; and a source of control signals applied to said control winding for controlling the saturation of said inductor; whereby said inductor is in parallel resonance with said first capacitance to provide a high impedance across the output of said A. C. signal generator when said control signals are low in potential, and whereby said inductor is in series resonance with said second capacitance to provide a low impedance across the output of said A. C. signal generator when said control signals are high in potential.

No references cited.